Patented Sept. 27, 1932

1,879,589

UNITED STATES PATENT OFFICE

CYRANO TAMA, OF BERLIN-SCHONEBERG, GERMANY, ASSIGNOR TO AJAX ELECTRO-THERMIC CORPORATION, OF AJAX PARK, NEW JERSEY, A CORPORATION OF NEW JERSEY

COMPOSITION FOR SMELTING HEARTHS

No Drawing. Application filed January 16, 1931, Serial No. 509,278, and in Germany January 17, 1930.

My invention relates to linings for electric induction furnaces.

A purpose of my invention is to employ a lining in an electric induction furnace containing beryllium oxide, and preferably also a material to assist in fritting.

For the manufacture of smelting hearths of induction furnaces, especially of crucible-shaped high-frequency furnaces, without channels, generally known as "coreless" such refractory materials as magnesite, electrically fused magnesia, corundum, chrome ore, oxide of zirconium, quartz sand, mullite, spinel, and the like, have been used. All these materials are suited, it is true, to the manufacture of the refractory linings mentioned, but some of their properties are disadvantageous. Too great a heat-conductivity, as is found, for instance, with corundum, as well as with electrically fused magnesia, causes great losses of heat through the crucible walls. In contradistinction to the other known furnace constructions, in which a great heat conductivity of the crucible material is desired, the refractory lining of an induction furnace requires preferably a refractory material having a low heat conductivity, as the energy is not introduced by conduction through the refractory lining, but is developed directly within the charge.

Besides, too high an electrical conductivity of the refractory linings is detrimental, as it is sometimes necessary to operate an inductor coil with a high voltage, which when used in connection with a refractory material having a high electrical conductivity is likely to entail detrimental consequence.

Other detrimental properties of the linings of the prior art are their low compressive strength, seen, for instance in chromium fettlings and linings, their chemical instability, evident in oxide of zirconium, their low softening points, as is the case with silicious fettlings and linings, and finally, their large expansions and contractions.

In the present invention I employ for the linings of electric induction furnaces, a material distinguished by its low heat conductivity and for its high softening point (more than 2000° C.) and its low coefficient of expansion.

According to this invention, the smelting hearth contains from 20 to 98% of beryllium oxide, as this substance possesses all of the above-mentioned properties. Furthermore, refractory linings made from beryllium oxide of suitable grain size and with suitable content of "mineralisators" (that is, those substances having a catalytic action in inducing sintering), in accordance with the well known principles of refractory manufacture, are very resistant to mechanical abrasion due to the circulation which is a peculiar feature of coreless induction furnaces.

Preferably, the beryllium oxide is mixed with other refractory oxides, according to the particular purpose for which it is intended. For melting metals with a high fusing point, as metals of the platinum and of the chromium group, a hearth consisting, for instance, of beryllium oxide and a fritting substance, such as oxide of tungsten, $WO_3$, oxide of molybdenum, $MoO_3$, pyroboric acid, pyro-phosphoric acid, sesquioxide of bismuth and the like has proved particularly suited for the purpose in view.

I find it highly desirable to make up part of the refractory lining of one of the well known refractory oxides. I include in this group a considerable range of substances heretofore used as refractory linings in electric induction furnaces. Where I desire, I may mix several refractory oxides with the beryllium oxide in a single lining.

Typical examples of refractory oxides are the oxides of magnesium, chromium, zirconium and thorium. I may also very desirably include with the beryllium oxide one or more refractory oxides, and suitable fritting substances.

I claim:—

1. A refractory lining for induction furnaces, containing from 20 to 98% of beryllium oxide and another refractory material.

2. A refractory lining for induction furnaces, containing from 20 to 98% of beryllium oxide and a refractory oxide.

3. A refractory lining for induction furnaces, containing from 20 to 98% of beryllium oxide and a plurality of refractory oxides.

4. A refractory lining for induction furnaces, containing from 20 to 98% of beryllium oxide and a substance of the group including magnesium oxide, chromium oxide, zirconium oxide and thorium oxide.

5. A refractory lining for induction furnaces, containing from 20 to 98% of beryllium oxide and a fritting substance.

6. A refractory lining for induction furnaces, containing from 20 to 98% of beryllium oxide and a substance of the group including oxide of tungsten, oxide of molybdenum, pyroboric acid and pyrophosphoric acid.

7. A refractory lining for induction furnaces, containing from 20 to 98% of beryllium oxide with an addition of a refractory oxide and a fritting substance.

8. A refractory lining for induction furnaces, containing from 20 to 98% of beryllium oxide with an addition of a plurality of refractory oxides and a fritting substance.

In testimony whereof I affix my signature.

CYRANO TAMA.